US009581087B1

(12) United States Patent
DeSilva et al.

(10) Patent No.: US 9,581,087 B1
(45) Date of Patent: Feb. 28, 2017

(54) METHOD AND SYSTEM FOR THERMAL EXPANSION COMPENSATION IN HEATED FLOW CHARACTERIZATION

(71) Applicant: Siemens Energy, Inc., Orlando, FL (US)

(72) Inventors: Upul P. DeSilva, Oviedo, FL (US); Heiko Claussen, North Brunswick, NJ (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/856,728

(22) Filed: Sep. 17, 2015

(51) Int. Cl.
*F02C 9/00* (2006.01)
*G01M 15/14* (2006.01)

(52) U.S. Cl.
CPC ............... *F02C 9/00* (2013.01); *G01M 15/14* (2013.01)

(58) Field of Classification Search
CPC .......... F01N 9/002; F02B 37/10; F02B 37/16; F02D 23/00; F02D 9/02; F02M 61/042; F02C 9/00; G01M 15/14
See application file for complete search history.

(56) References Cited

U.S. PATENT DOCUMENTS

| 4,785,635 | A | * | 11/1988 | Melchior | F02B 37/02 60/606 |
| 5,596,957 | A | * | 1/1997 | Ichinose | F02B 29/02 123/179.18 |
| 7,853,433 | B2 | | 12/2010 | He et al. | |
| 8,565,999 | B2 | | 10/2013 | Bunce et al. | |
| 2009/0229254 | A1 | * | 9/2009 | Gibson | B01F 5/0603 60/282 |
| 2009/0314309 | A1 | * | 12/2009 | Sankarakrishnan | B08B 5/00 134/1.1 |
| 2013/0197855 | A1 | * | 8/2013 | Oskam | G01M 15/14 702/135 |
| 2014/0144156 | A1 | * | 5/2014 | Lang | G01K 11/24 60/793 |
| 2014/0278200 | A1 | | 9/2014 | DeSilva | |
| 2015/0017070 | A1 | * | 1/2015 | Yamane | F02D 41/405 422/119 |
| 2015/0082777 | A1 | * | 3/2015 | Tsumagari | F23G 7/065 60/320 |

(Continued)

FOREIGN PATENT DOCUMENTS

| EP | 1930568 A1 * | 6/2008 | ............. F01D 17/08 |
| GB | 2289721 A * | 11/1995 | ............. F02C 6/003 |

(Continued)

*Primary Examiner* — Tuan C. To

(57) ABSTRACT

Techniques for a chamber, such as gas turbine engine (100), surrounding a heated fluid include a sensor (150) mounted in a first wall (228b, 229b) of the chamber to detect phenomenon inside the chamber and a processor (702). The processor is in electrical communication with the sensor and is configured to receive first data, determine a first temperature of the first wall, determine a current path length, determine properties of the fluid flow, and operate a device based on the properties. First data indicates a value of the phenomenon along a path between the first wall and a different wall of the chamber. The current path length (268b) is based on a nominal path length (268a) and thermal expansion of the first wall due to the first temperature. The property of fluid flow in the chamber is based on the first data and the current path length.

20 Claims, 10 Drawing Sheets

(56) References Cited

U.S. PATENT DOCUMENTS

| | | | |
|---|---|---|---|
| 2015/0167466 A1* | 6/2015 | Teodorescu | E21B 47/01 175/40 |
| 2015/0168229 A1 | 6/2015 | DeSilva | |
| 2015/0168230 A1 | 6/2015 | DeSilva et al. | |
| 2015/0260611 A1* | 9/2015 | DeSilva | G01M 15/14 73/112.01 |
| 2015/0377166 A1* | 12/2015 | Yasuda | F02D 41/0002 123/406.41 |
| 2016/0281642 A1* | 9/2016 | Le Gonidec | F02K 9/96 |

FOREIGN PATENT DOCUMENTS

| | | | | |
|---|---|---|---|---|
| GB | 2347221 A | * | 8/2000 | F01D 17/085 |
| WO | 2014/194056 A1 | | 12/2014 | |

\* cited by examiner

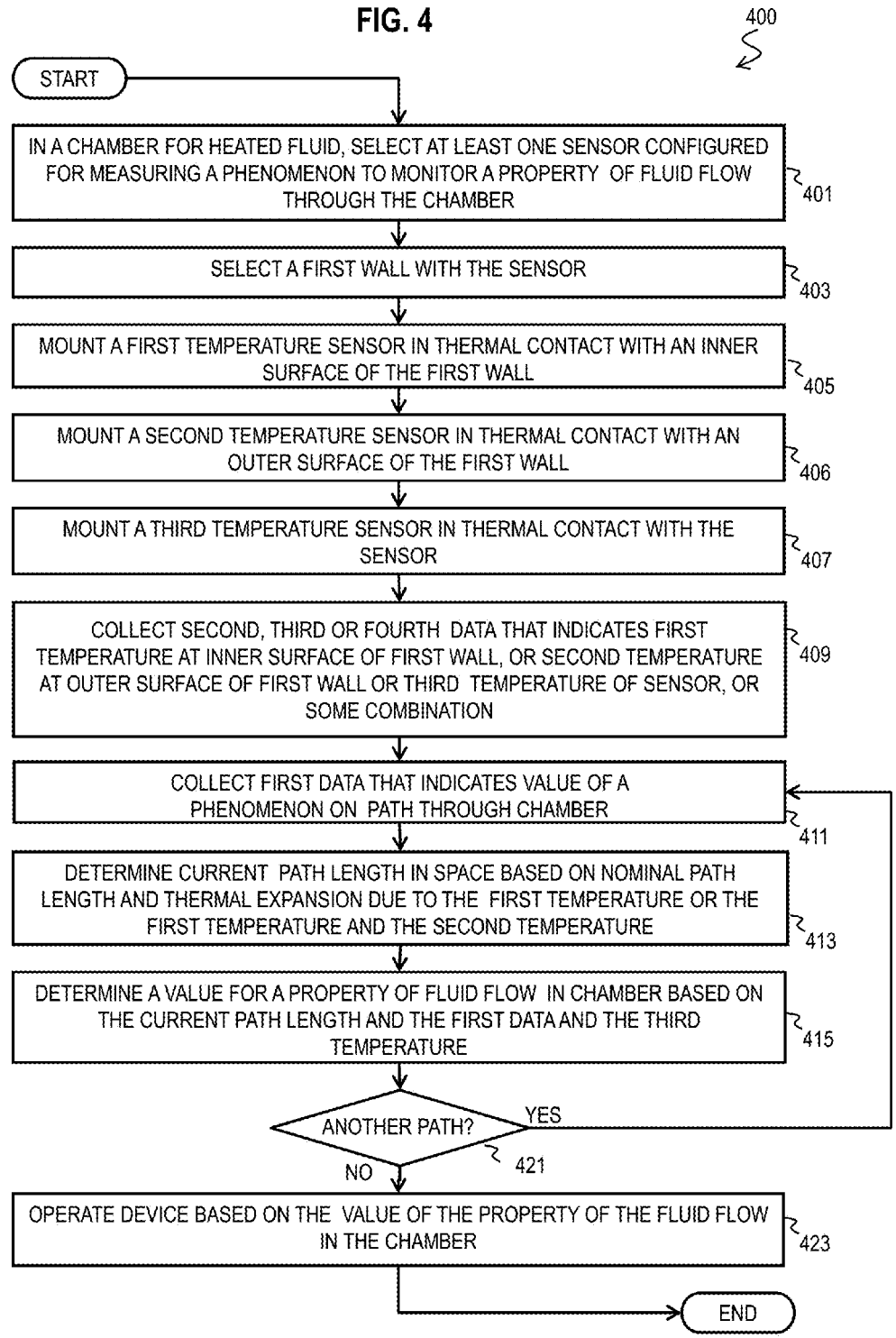

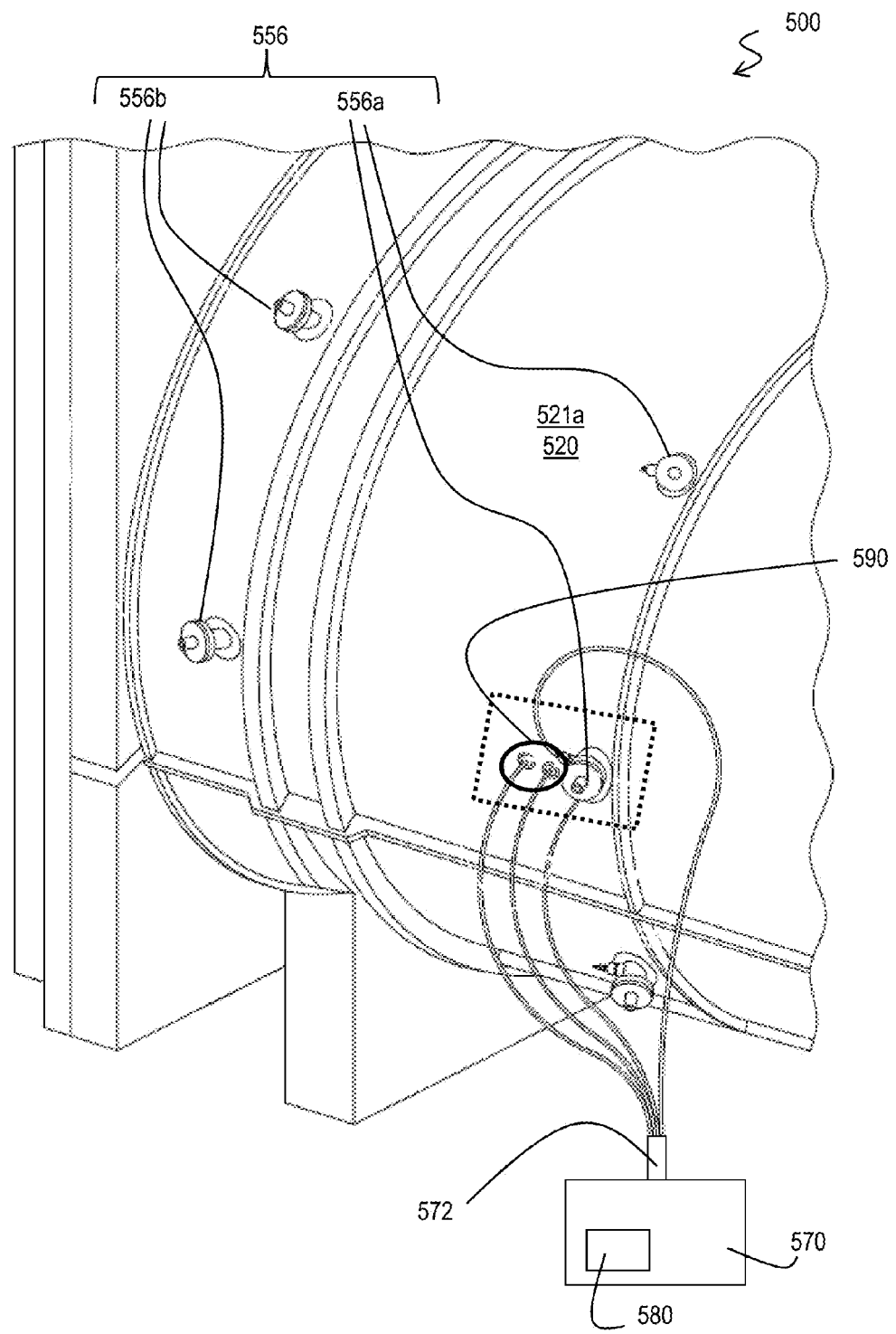

METHOD AND SYSTEM FOR THERMAL EXPANSION COMPENSATION IN HEATED FLOW CHARACTERIZATION

FIELD OF THE INVENTION

The various embodiments relate to determining the distribution of fluid properties in a chamber of heated fluid, such as gas flow properties in a gas turbine engine.

BACKGROUND OF THE INVENTION

A gas turbine engine is a flow machine in which a pressurized gas expands. The gas turbine includes a turbine or expander, a compressor connected upstream of the turbine, and a combustion chamber between the compressor and turbine. Expanding gas produced in the combustion chamber drives blades of the turbine which provides power for the compressor and other engine output. The compression of air by way of the blading of one or more compressor stages, subsequently mixes the compressed air in the combustion chamber with a gaseous or liquid fuel, where the mixture is ignited by an igniter to initiate combustion. The combustion results in a hot gas (mixture composed of combustion gas products and residual components of air) which expands in the following turbine section, with thermal energy being converted into mechanical energy in the process to drive an axial shaft. The shaft is connected to and drives the compressor. The shaft also drives a generator, a propeller or other rotating loads. In the case of a jet power plant, the thermal energy also accelerates a hot gas exhaust stream, which generates the jet thrust.

The gas turbine engine is designed to operate within certain ranges of pressure, velocity and temperatures of both the air and hot gas combustion products that vary with location through the engine. Optimal performance is achieved within very narrow ranges. Thus, to validate the design or to ensure that the gas turbine engine is operating within specified ranges or to make adjustments to attain the optimal performance, it is desirable to know the actual distribution of temperature, pressure and velocity during operation. Determining such distributions is challenging, at least in part, because the pressures and temperature can become very great.

Current approaches to monitoring the distribution of pressure, temperature and velocity in a gas turbine engine include some intrusive probes that project into the gas flows, including probes mounted on vanes (e.g., Kielhead probes) to obtain some profiles of velocity and temperature. Optical instruments have been used, but the characteristics of the optical devices can degrade at the extreme temperatures in at least portions of the turbine engine. Non-intrusive acoustic approaches have been implemented and promise to avoid deficiencies in other approaches.

BRIEF DESCRIPTION OF THE DRAWINGS

Various embodiments of the invention are explained in the following description in view of the drawings that show:

FIG. 4 is a flow diagram that illustrates an example method for compensating for thermal expansion while determining a property of fluid flow in a chamber, according to an embodiment;

FIG. 5 is a diagram that illustrates an example exhaust diffuser with multiple acoustic transducers and at least one pair of temperature sensors, according to an embodiment;

DETAILED DESCRIPTION OF THE INVENTION

Figure 1A:
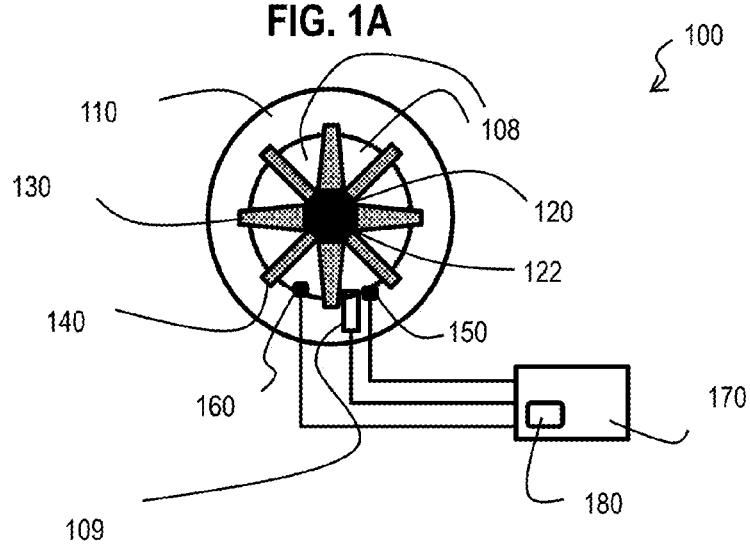
FIG. 1A is a block diagram that illustrates an example radial cross section of a gas turbine engine and control system, according to an embodiment.

An acoustic temperature and velocity mapping sensor system characterizes the hot fluid flows in real time under extreme environments such as boilers, gas turbine exhausts and gas turbine combustors. This sensor technology is based on continuously finding the time of flight of acoustic waves accurately across a space of the fluid flow. Although this method has very high accuracy, the inventors recognized that some uncertainty is introduced into the derivation of fluid flow properties due to thermal expansion of the walls that hold the acoustic transducers and enclose the space of the fluid flow. Acoustic calibration can reduce this to some degree. For example auto calibration of distances at a known temperature (e.g., ambient temperatures for an offline turbine) can provide precise distance information, e.g., as described in PCT/US2014/039971, the entire contents of which are hereby incorporated by reference as if fully set forth herein, except for terminology inconsistent with that used herein. However, during transitions from one fluid temperature to another, the distances the acoustic signals travel between emitting and receiving acoustic transducers, and within an acoustic waveguide, change with the changing temperatures. This effect causes increased uncertainty in the measurement and therefore in the derived fluid flow properties, such as fluid flow temperatures or velocities.

A method and system are described for compensating for thermal expansion when determining a distribution of properties in a chamber with a heated moving fluid, such as liquid in a boiler or gas in a gas turbine engine. As used herein a fluid is a material state that moves in response to a shearing stress, and includes both gas and liquid states of a material. In a gas turbine engine the fluid is a gas comprising air, or an air and fuel mixture, or gases that result from combustion of air and fuel, or some combination. As used herein a chamber is a structure with one or more walls that surround, but need not enclose, a fluid, such as a gas or liquid.

Although embodiments are described below with reference to acoustic sensors, in other embodiments thermal expansion is used to correct properties of the heated fluid based on measurements of a phenomenon made by other sensors. For example, the phenomenon refraction in the chamber is measured by optical sensors to determine an index of refraction of the fluid in the chamber and thus, for many materials, the property of temperature of fluid flow; or, the phenomenon of travel time of an optical pulse is measured to determine the index of refraction which can be used to determine the fluid property of temperature for many materials; or, the phenomenon is a number of scatterers in a beam of light is detected by an optical sensor to and used to derive the property of the concentration of particulates in the fluid flow. Furthermore, all sensing systems that rely on a sensor network or array, such as around the periphery of the turbine exhaust or combustor, and that evaluate properties of the fluid flow (direction, speed, temperature, density, mass flow, gas constant, gas composition) will rely somewhat on the accuracy of the knowledge of the sensor positions themselves. The reason that these methods have multiple sensors is that they compare the measurements, such as through triangulation or beamforming, which are dependent on the sensor locations. Optical systems that have to be calibrated for the measurement distance or sensor locations include laser Doppler velocimetry or particle tracking velocimetry. All these measurements are affected by the actual dimensions of the chamber which can change due to thermal expansion. Thus, in general a sensor is mounted in a first wall of the chamber to detect a phenomenon in the chamber. A processor in electrical communication with the sensor is configured to receive from the sensor first data that indicates a value for the phenomenon along a path through the chamber between the first wall and a different wall of the chamber. The same or different processor determines a first temperature of the first wall, in some embodiments based on the sensor measurement itself, as described below. The same or different processor determines a current path length of the path based at least in part on a nominal path length for a nominal temperature different from the first temperature and thermal expansion of the first wall due to the first temperature. The same or different processor then determines a property of fluid flow in the chamber based on the first data and the current path length of the path.

FIG. 1A is a block diagram that illustrates an example radial cross section of a gas turbine engine and control system 100, according to an embodiment. This cross section includes a housing 110 symmetrically disposed around an axial shaft 122 that is perpendicular to the view of FIG. 1A. The shaft is part of a shaft assembly 120 that encloses the shaft and seals, at least partially, the gases inside the shaft assembly 120 from a main flow of air or other gas between the shaft assembly 120 and the housing 110. Fixed to the housing 110 and shaft assembly 120 are one or more stator stages of stator vanes 140. Each stator stage includes multiple stator vanes 140 spaced azimuthally around the shaft assembly 120. The stator vanes direct the main flow onto the rotor blades 130 in one or more rotor stages. Each rotor stage includes multiple rotor blades 130 spaced azimuthally around the shaft assembly 120 and displaced axially from a corresponding stator stage. Each rotor blade is connected to the axial shaft 122 and configured to rotate with the shaft 122 around an axis of rotation of the axial shaft, which runs along a length of the shaft, and thus is also perpendicular to the view of FIG. 1A.

Also included in this cross section is an acoustic actuator 160 (also called an acoustic transmitter) configured to introduce acoustic energy into the main gas flow (called simply gas flow hereinafter), and an acoustic sensor 150 (also called acoustic receiver) configured to detect acoustic energy from the gas flow. In some embodiments, there are multiple acoustic actuators 160 or acoustic sensors 150 or both, collectively called acoustic transducers. In some embodiments, either or both of one or more acoustic actuators 160 and acoustic sensors 150 are acoustic transceivers that are acoustic transducers that can both emit and detect acoustic signals. In some embodiments, there are no acoustic actuators.

Figure 7:
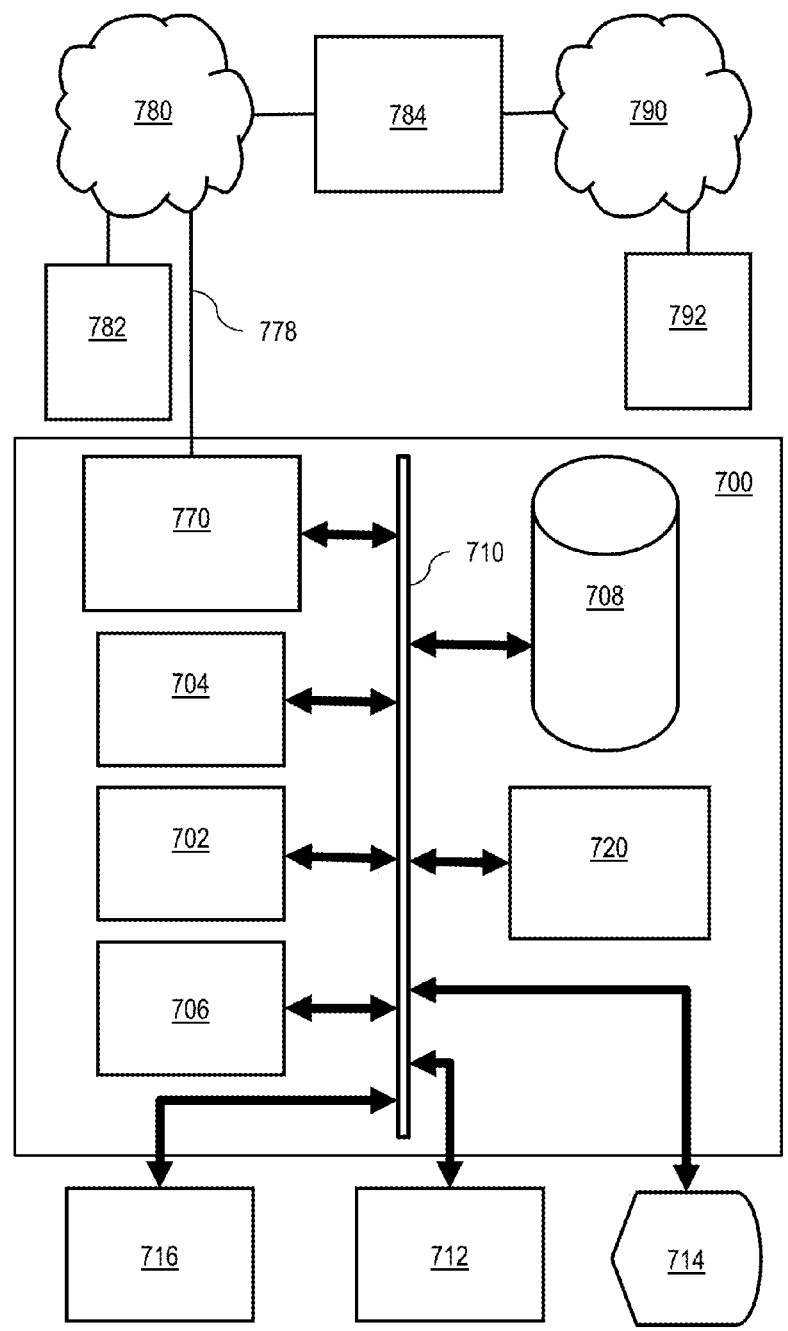
FIG. 7 is a block diagram that illustrates a computer system upon which an embodiment of the invention may be implemented.
Figure 8:
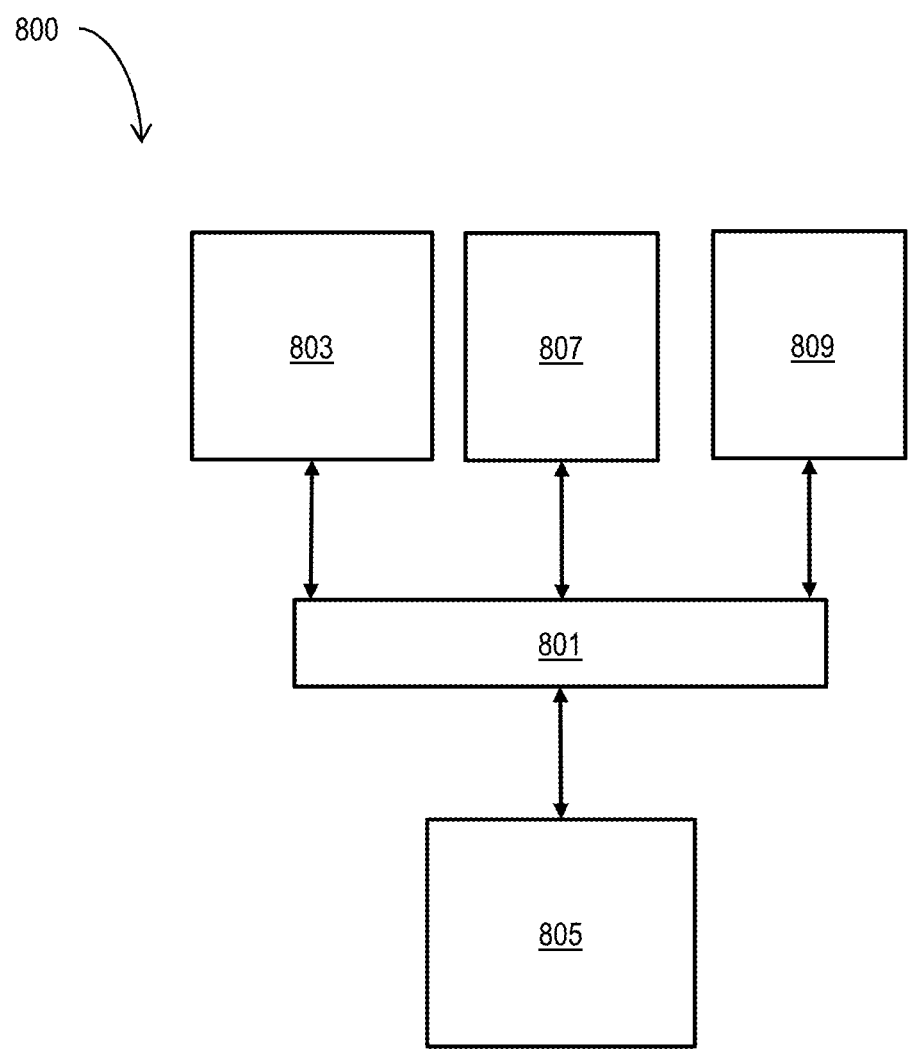
FIG. 8 is a block diagram that illustrates a chip set upon which an embodiment of the invention may be implemented.

The acoustic actuator is driven by electronic signals sent by control system 170 and electronic signals output from acoustic sensor 150 are collected and processed into acoustic data, or stored, or some combination, at the control system 170. The control system 170 includes a chip set as depicted in FIG. 8 or a computer system as depicted in FIG. 7, and as described in more detail below in reference to those figures. The lines connecting sensor 150 and actuator 160 to control system 170 indicate channels of electrical communication and may be wired or wireless.

Also included in system 100 are zero or more temperature sensors, such as pair 109 of temperature sensors. The sensors are configured to determine the temperature changes in one or more walls that enclose a space where the gas flow is to be characterized in order to compensate for thermal expansion changing the length of acoustic paths from acoustic actuator 160 to acoustic sensor 150. Although the temperatures they provide can be used to derive a temperature boundary condition for the space in some embodiments, these temperature sensors are not designed to measure the temperature of the fluid flow away from the walls. The pair 109 of temperature sensors are also connected to the control system 170 by one or more wired or wireless channels of electrical communication. In some embodiments, no temperature sensors are used.

The control system includes a thermal compensation module 180 configured to deduce the distribution of temperature and velocity in at least a portion of the main flow based on the data collected from the acoustic sensor 150 while compensating for thermal expansion of the walls bordering the space based on the one or more temperature sensors. In some embodiments, no temperature sensors are used; and, instead, the derived gas flow temperatures are used to estimate the wall temperatures and resulting thermal expansion. In some of these embodiments, temperature in the gas flow is then recomputed using the thermally expanded distances. The temperature at the wall can be determined in an iterative or optimization approach in various embodiments.

In some embodiments, the acoustic actuator 160 is omitted. In some embodiments, the acoustic actuator 160 is configured to place acoustic signals into the gas flow, using signals that are designed to assist in the determination of the distribution of temperature or velocity, or both, in the gas flow of the gas turbine engine 100 in the presence of other acoustic signals or in the presence of acoustic or electronic noise, or some combination.

Figure 1B:
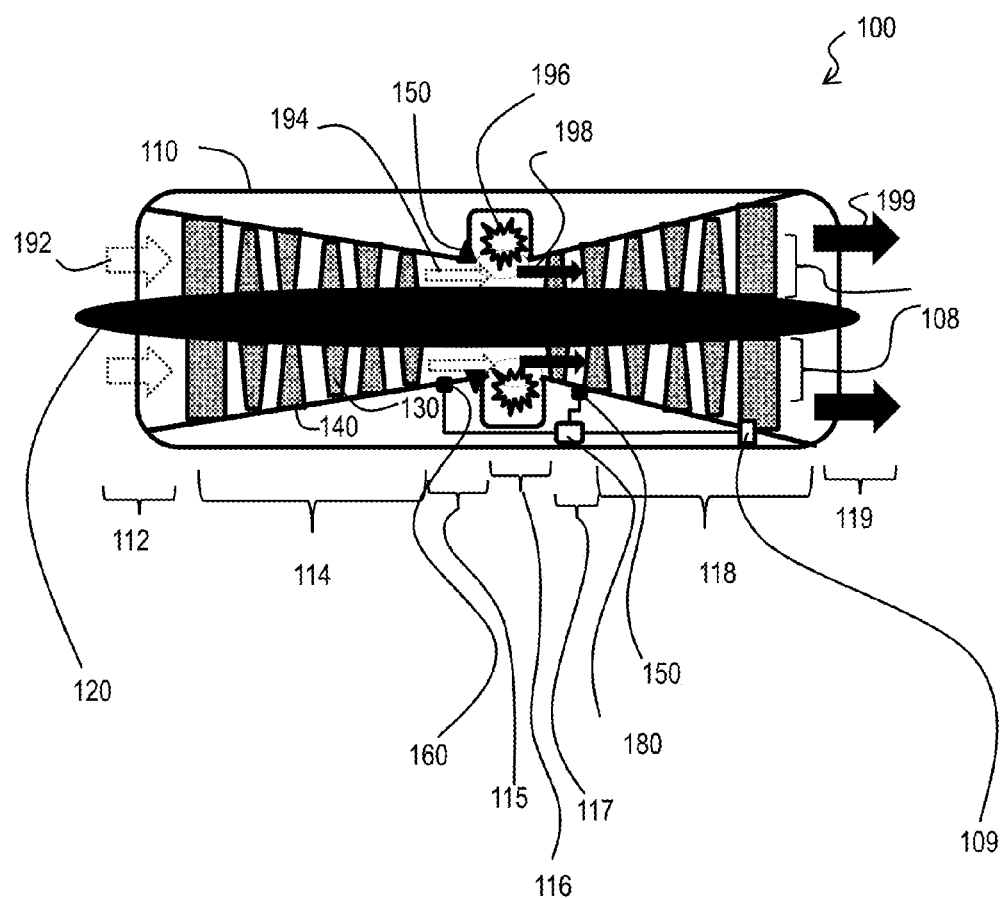
FIG. 1B is a block diagram that illustrates an example axial cross section of a gas turbine engine with components of a control system, according to an embodiment.

FIG. 1B is a block diagram that illustrates an example axial cross section of a gas turbine engine and control system 100, according to an embodiment. The system includes housing 110, shaft assembly 120, rotor blades 130, stator vanes 140, acoustic sensor 150, acoustic actuator 160, pair 109 of temperature sensors and thermal compensation module 180 as defined above with reference to FIG. 1A. As can be seen in FIG. 1B, along the axis the engine includes, in succession, an inlet section 112, a compressor section 114, a compressor diffuser section 115, a combustion section 116, a transition section 117, a turbine section 118, and an exhaust section 119. In some embodiments, one or more of these sections are omitted, but all gas turbine engines include a compressor section 114, a combustion section 116 and a turbine section 118.

Once the air flows out of the compressor diffuser section 115, it enters the combustion section 116, also called the combustor, where fuel is added and the mixture is ignited. Combustion liners position and control the fire resulting from combustion in order to prevent flame contact with any metal parts that would be softened or melted in contact with the flame. For example, six combustion liners (cans) are positioned at different azimuthal positions within an annulus created by inner and outer combustion cases adjacent the shaft assembly 120 and housing 110, respectively. In some embodiments, the exhaust section includes an exhaust diffuser where velocity is reduced by diffusion and pressure is recovered. At the exit of the exhaust diffuser, turning vanes direct the gases into an exhaust plenum, a separate space provided for air circulation. In this configuration, the chamber is one or more sections of the gas turbine engine, or portions thereof; and, the walls of the chamber are made up of an inner wall of the housing 110, and, if present, an outer wall of the shaft assembly, in one or more sections of the engine, or portions thereof.

Figure 2A:
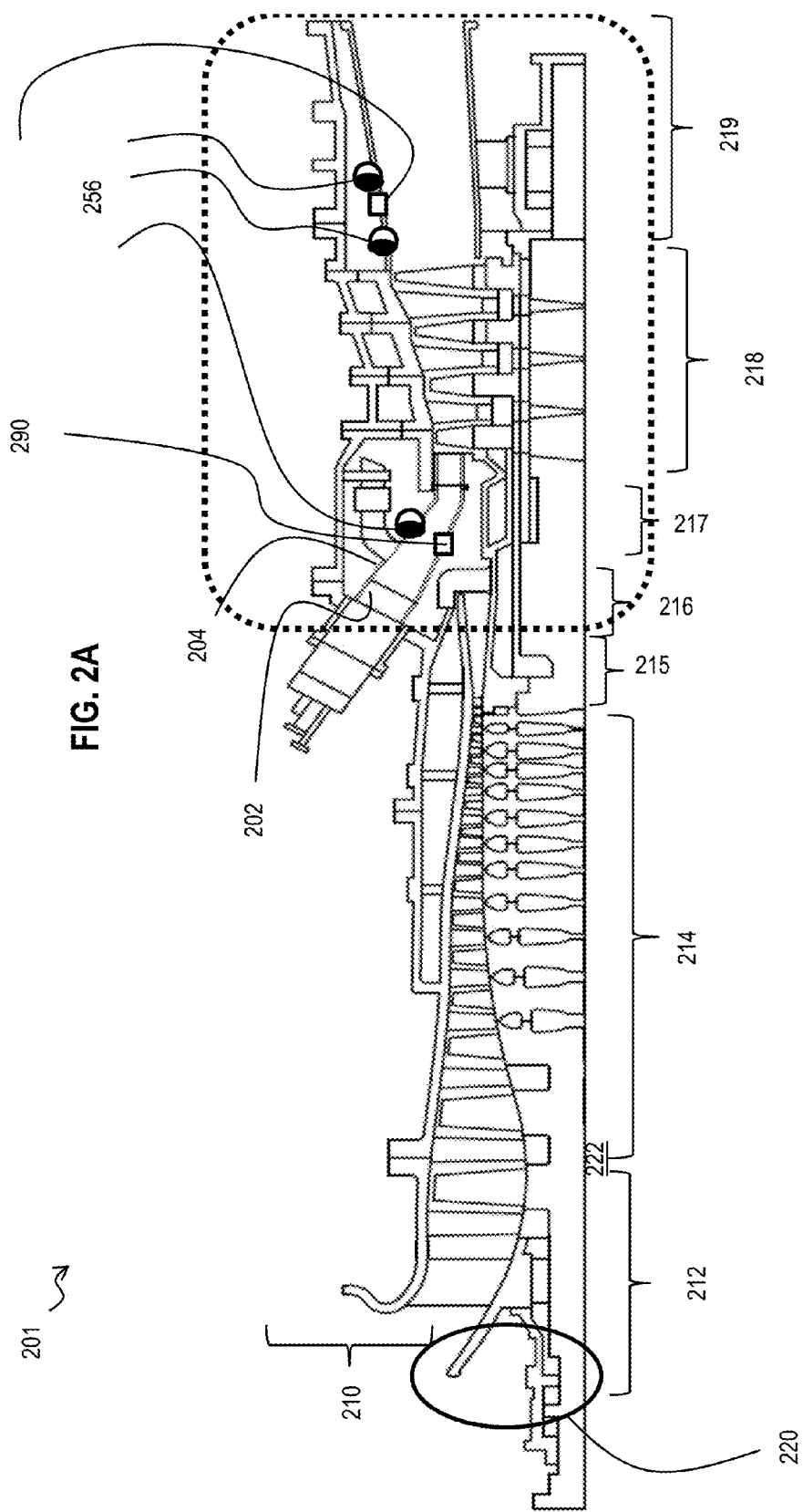
FIG. 2A through FIG. 2C are block diagrams that illustrate an upper half of a cross section of a gas turbine engine with example configuration of acoustic transducers and temperature sensors; according to various embodiments.
Figure 2B:
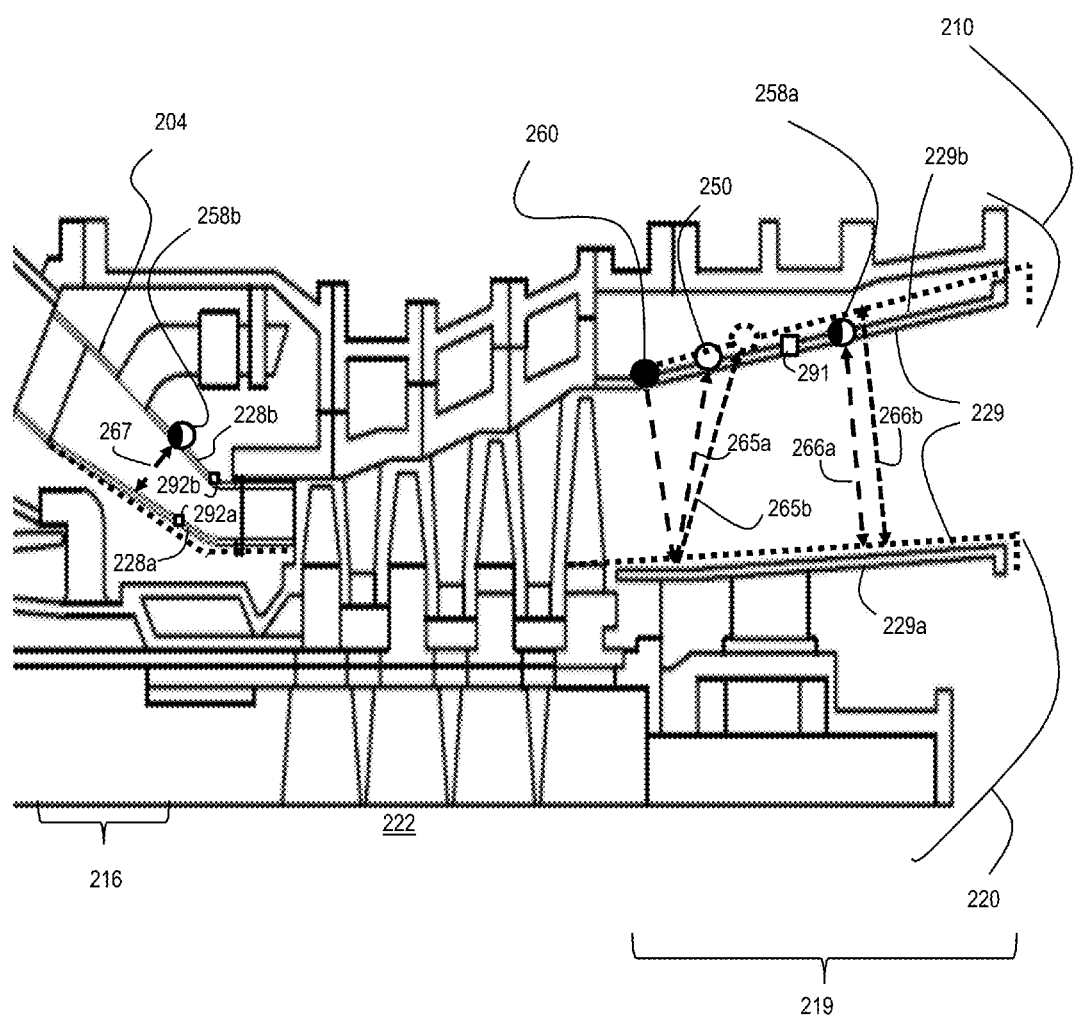

FIG. 2A and FIG. 2B are block diagrams that illustrate an upper half of a cross section of a gas turbine engine 201 with example configuration of acoustic transducers and temperature sensors; according to various embodiments. The control system (such as control system 170) and communication lines thereto of a complete system for engine 201 are omitted for clarity. The portion of the cross section depicted is above an axial shaft 222, and includes an upper portion of a shaft assembly 220 and housing 210 separated by gas flow spaces in each of multiple chambers defined by one or more of multiple stages of rotors and stators in each of an inlet section 212, compressor section 214, diffuser section 115, combustion section 216, transition section 217, turbine section 218 and exhaust section 219, analogous to those sections described above. Also depicted is an igniter 202 in the combustion section 216 and a combustion liner 204 (can) that extends from the combustion section 216 through the transition section 217 and discharges into the turbine section 218.

According to various embodiments, one or more acoustic transducers 256 (such as actuators, sensors or transceivers) are mounted to emit and detect acoustic signals in a space of gas flow through a chamber of the gas turbine engine without extending into the space. In other embodiments, such as in some embodiments described in more detail below, the transducers 256 are disposed in different sections of a gas turbine engine than depicted with transducers 256 in FIG. 2A. To compensate for thermal expansion, zero or more temperature sensors, such as pairs 290 of temperature sensors, are also included in walls of chambers that border one or more spaces to be probed acoustically by transducers 256 to characterize temperature or velocity, or both, of the gas flow away from the walls.

In one embodiment, the sections outlined by a dotted curve in FIG. 2A are populated with one or more sensors 250 or actuators 260 or transceivers 258. While acoustic actuators (transmitters) and sensors (receivers) are distinguished in embodiments depicted in FIG. 2B among other drawings to follow, it is understood that in alternative embodiments one or more are each replaced by an acoustic transceiver that can function as both an acoustic sensor and an acoustic actuator at the same time or at different times, or by a sensor of a different type configured to make measurement of other physical phenomena.

In the sections indicated by dotted line in FIG. 2A, FIG. 2B depicts the housing 210 that includes a combustion liner 204 and an outer wall 229b of an exhaust diffuser 229, and the shaft assembly 220 that includes the axial shaft 222 and an inner wall 229a of the exhaust diffuser 229. For purposes of illustration, it is assumed that at increased temperatures, as experienced during normal or hotter operations, the exhaust diffuser 229 and the combustion liner 204 undergo some degree of thermal expansion so that their walls move relative to their cooler disposition. The expanded location of these walls are illustrated by the dotted lines adjacent to inner wall 229a and outer wall 229b of exhaust diffuser 229 and wall 228a of combustion liner 204. Note that these are block diagrams not drawn to scale and the positions of the dotted lines are drawn in order to highlight the phenomenon without obscuring the diagram. It is further assumed that one wall is fixed by support structures at fewer locations so that it is more free to move in response to the thermal expansion than another wall. For example, it is assumed that outer wall 229b of exhaust diffuser 229 is freer to respond to the thermal expansion than the inner wall 229a of the exhaust diffuser 229. Similarly, it is assumed that wall 228a of combustion liner 204 is freer to respond to the thermal expansion than the opposite wall 228b of the combustion liner 204.

One or more acoustic sensors 250 (represented by open circles) or acoustic actuators 260 (represented by filled circles) or acoustic transceivers 258a and 258b (collectively referenced hereinafter as transceivers 258 and represented by half-filled circles) are mounted in or opposite the walls that are expanding freely. The acoustic measurements made by these sensors, actuators and transceivers are affected by the geometrical changes of the spaces they are monitoring, or by geometrical changes of acoustic or other waveguides feeding acoustic or optical energy into or out of the spaces, due to thermal expansion.

For example, at cooler or design temperatures, the acoustic path 265a through a space in the exhaust diffuser 229 from actuator 260 to sensor 250 has a nominal path length. But, after thermal expansion at higher temperatures, the sensor 250 is displaced further from the actuator 260 as indicated by the dashed open circle. In this expanded state, the acoustic path 265b is longer. Similarly, at cooler or design temperatures, the acoustic path 266a through a space in the exhaust diffuser 229 back and forth at transceiver 258a has a nominal path length. But, after thermal expansion at higher temperatures, the transceiver 258a is displaced further from the reflecting inner wall 229a. In this expanded state, the acoustic path 266b is longer.

Even if the acoustic transducer is not in the wall with more freedom to expand, the acoustic geometry is affected. For example, at cooler or design temperatures, the acoustic path 267 through a space in the combustion liner 204 back and forth at transceiver 258b has a nominal path length. But, after thermal expansion at higher temperatures, the reflecting inner wall 228a is displaced further from the transceiver 258b. In this expanded state, the acoustic path (not shown) is longer.

Figure 2C:
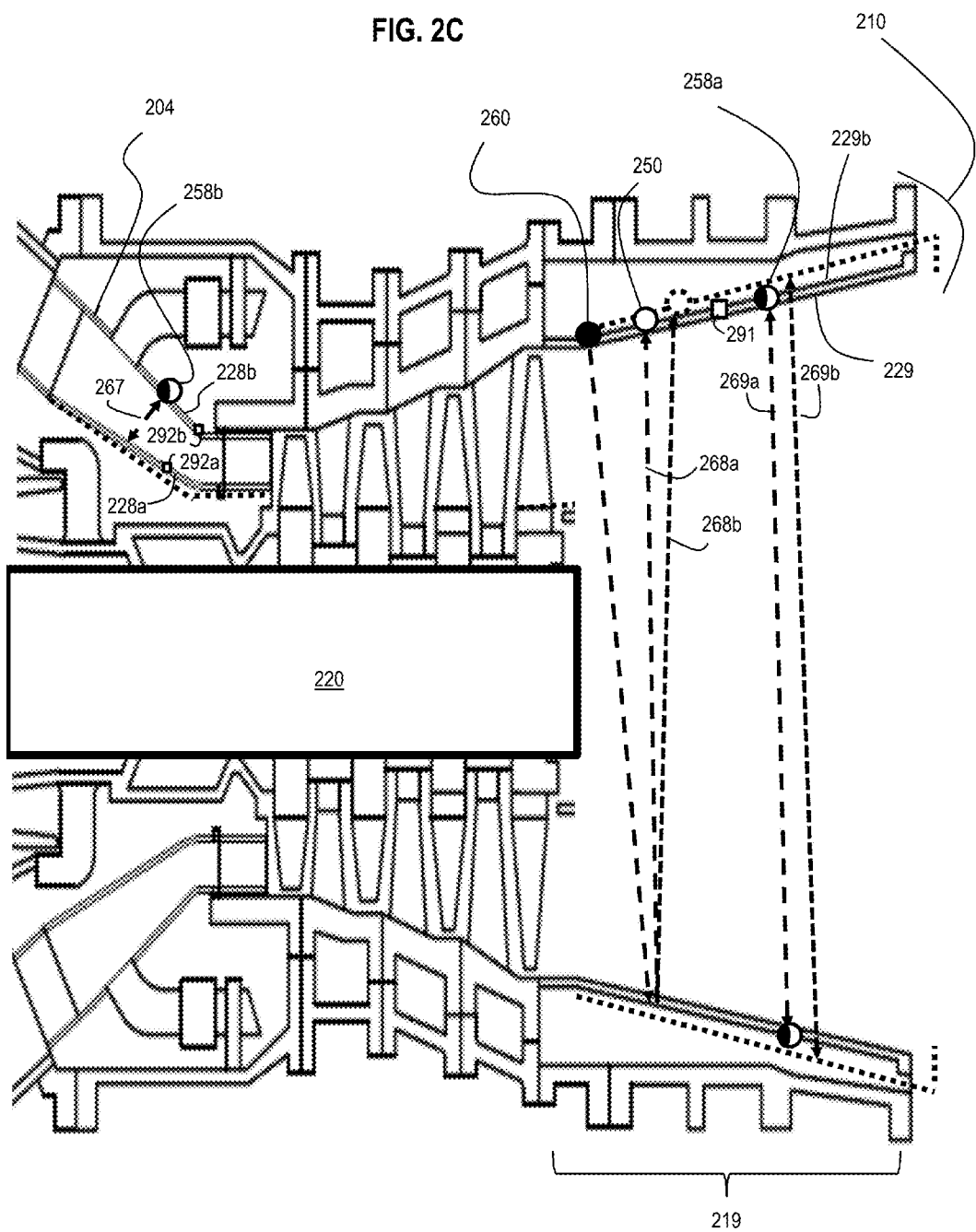

FIG. 2C depicts the housing 210 that includes a combustion liner 204 and an outer wall 229b of an exhaust diffuser 229, and the shaft assembly 220 that does not extend into the exhaust diffuser 229. For purposes of illustration, it is assumed that at increased temperatures, as experienced during normal or hotter operations, the exhaust diffuser 229 and the combustion liner 204 undergo some degree of thermal expansion so that their walls move relative to their cooler disposition. The expanded locations of these walls are illustrated by the dotted lines adjacent to the opposite portions of the outer wall 229b of exhaust diffuser 229 depicted in FIG. 2C. Note that these are block diagrams not drawn to scale and the positions of the dotted lines are drawn in order to highlight the phenomenon without obscuring the diagram. In this embodiment, the detected acoustic beams 268a, 268b, 269a, 269b are reflected off, or detected by acoustic transducers on, opposite sides of the same outer wall 229b. With the nearest support structures at an upstream end of this outer wall 229b, this outer wall 229b is free to expand more than any other wall depicted in FIG. 2C.

In various embodiments, the effect of thermal expansion is computed and used to compensate for path length changes of the acoustic beams based on wall temperatures determined by zero or more temperature sensors, or a temperature difference at a pair of temperature sensors, such as thermocouples that operate readily at the high temperatures inside combustion cans and exhaust diffusers. This is demonstrated schematically in both FIG. 2B and FIG. 2C by the pair 291 of temperature sensors in an outer wall 229b of exhaust diffuser 229, and by temperatures sensors 292a and 292b, collectively referred to hereinafter as pair 292 of temperature sensors, in inner wall 228a and outer wall 228b, respectively, of combustion liner 204.

Figure 3:
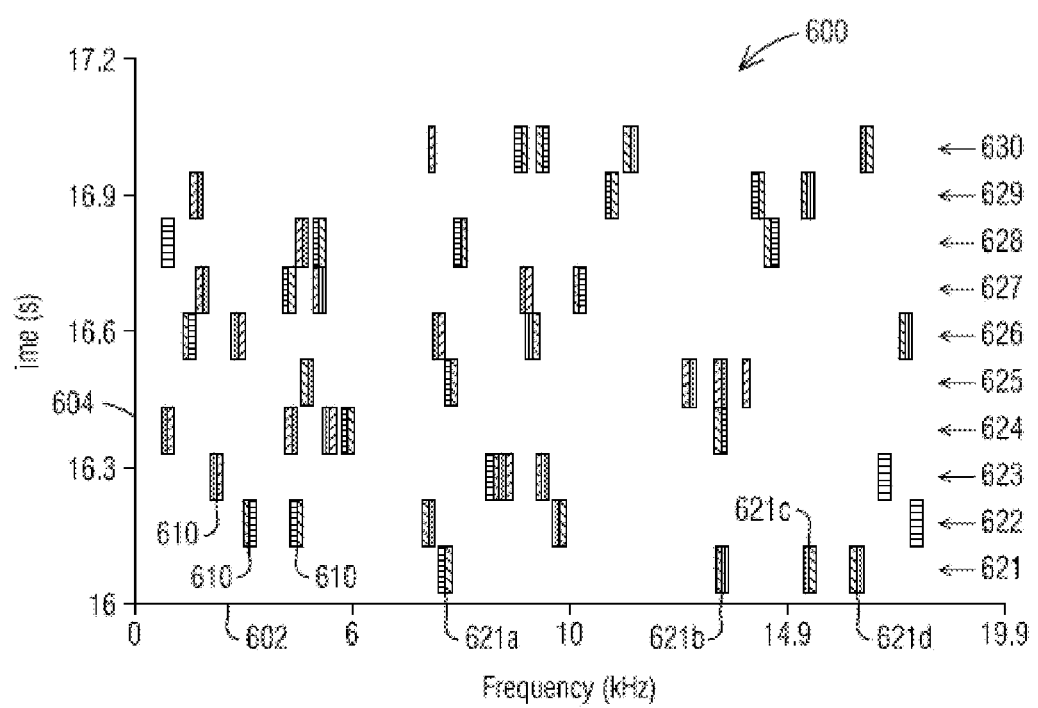
FIG. 3 is a graph that illustrates an example series of known acoustic signals that can be used alone or in combination by an acoustic actuator, according to various embodiments.

According to various embodiments of the acoustic systems to determine gas flow temperature or velocity, the acoustic signals used are distinctive from ordinary sounds made during operation of the gas turbine engines and from each other. FIG. 3 is a graph 600 that illustrates an example series of known acoustic signals that can be used alone or in combination by one or more acoustic actuators or transceivers, according to various embodiments. As can be seen, the distinctive signals are depicted as distinct frequency marks, generally designated 610, that are spaced apart in frequency, i.e., are non-broadband, and are discontinuous in time. That is, a sub-group of distinct frequencies, e.g., four or five frequencies, are transmitted as a signal sub-group at a particular time for a short duration (about 100 milliseconds). Different signal sub-groups are transmitted sequentially in time. The distinctive signal from one acoustic actuator (transmitter or transceiver) is made up of one or more sub-groups. Different acoustic actuators use different sets of one or more sub-groups. In some embodiments different frequency chirps are used by different actuators.

As illustrated in FIG. 3, each signal sub-group is designated as 621 through 630, and the frequency marks for signal sub-group 621, marking distinct frequencies, are designated as 621a, 621b, 621c, 621d. The corresponding received signal can be correlated with this signal to determine the time of maximum correlation. That time indicates the time that this signal reached that sensor and can be detected in the presence of noise and other sounds originating in the gas turbine engine.

Each successive signal sub-group 622 through 630 includes different distinct frequencies from the frequencies in the other signal sub-groups. Hence, in addition to the signal sub-groups 621-630 each forming a distinct identifiable pattern, or individual signature, along the frequency axis, the series of successive signal sub-groups 621-630 also form a distinct identifiable pattern, or overall signature, of frequencies along the time axis. Forming a signature of a plurality of the sub-groups increases the distinctness of the signature, improves detectability, and provides a more precise autocorrelation peak in time, thus ensuring an accurate travel time measurement.

FIG. 4 is a flow diagram that illustrates an example method for compensating for thermal expansion while determining temperature property of fluid flow in a chamber, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401 one or more sensors (e.g., acoustic transducers) in a wall of a chamber are used as a corresponding number of sources or receivers to introduce or detect, or both, distinctive signals of some phenomenon, e.g., as depicted in FIG. 3 for acoustic signals, into a space inside the chamber to be monitored. In various embodiments, the chamber is a boiler or portion thereof configured for heating one or more liquids, such as water, or is one or more sections, or portions thereof, of a gas turbine engine, or is a heat exhaust system, e.g., from a power plant or other facility. In an illustrated embodiment, the space is acoustically monitored for deducing sound travel time along one or more acoustic paths; and, hence for inferring temperature or velocity of fluid flow, or both, in the space inside the chamber. If not already mounted on a wall of the chamber, the one or more sensors for the phenomenon are mounted on one or more walls of the chamber during step 401. One or more sensors are selected during step 401 based on the susceptibility of the sensors to have their measurements affected by thermal expansion as the walls of the chamber are heated. Such walls are often supported by few or far support structures, such as brackets or legs. Thus method 401 applies to a system that includes a chamber configured to surround a heated fluid, and a sensor mounted in a first wall of the chamber to detect a phenomenon in the chamber. For convenience the phenomenon data collected from the sensor is called "first" data.

For example, in one embodiment, during step 401, transceiver 258b is selected as making measurements along acoustic path 267 subject to error due to the expansion of wall 228 during heated operations outside calibrated conditions. In another embodiment, during step 401, the transducer pair made up of actuator 260 and sensor 220 is selected as making the measurements along acoustic paths 265a subject to error due to the expansion of diffuser outer wall 229b during heated operations outside calibrated conditions. This causes the actual acoustic path 265b to be longer than the nominal path 265a in a manner that depends on the temperature of the outer wall 229b. In yet another embodiment, during step 401, the transceiver 258a is selected as making the measurements along acoustic path 266a subject to error due to the expansion of diffuser outer wall 229b during heated operations outside calibrated conditions. This causes the actual acoustic path 266b to be longer than the nominal path 266a in a manner that depends on the temperature of the outer wall 229b. In some embodiments multiple acoustic transducers are selected for a corresponding number of spaces, e.g., for both the combustion liner 204 and the exhaust diffuser 229. In some embodiments, the diffuser is aft of any shaft assembly and the reflective surface or second acoustic transducer is on an opposite outer wall, as depicted in FIG. 2C.

In step 403, one wall is selected for measuring temperature. For example, in some embodiments the selected wall is the wall that has greater freedom to expand with temperature increases than any other wall adjacent to the space being acoustically monitored. For example, in one illustrated embodiment, combustion liner wall 228a is assumed to be less rigidly supported and therefore is assumed to have more freedom to move during thermal expansion and is therefore selected during step 403 as the "first" wall. Similarly, in another illustrated embodiment, exhaust diffuser outer wall

229b is assumed to be less rigidly supported and therefore is assumed to have more freedom to move during thermal expansion and is therefore selected as the "first" wall during step 403.

In step 405 a "first" temperature sensor is mounted in thermal contact with an inner surface of the first wall to monitor temperature of the first wall, for each of one or more chambers, or spaces in a single chamber, to be monitored. In some embodiments, mounting the first temperature sensor is done to determine the temperature controlling thermal expansion of the wall most free to respond. In some embodiments, the hottest wall temperature is of interest and the temperature sensor is mounted to respond to the temperature on the surface of the wall closest to the hottest expected fluid flow, which is expected to be the hottest surface of the wall. This may or may not be the wall or surface on which the sensor (e.g., the acoustic transducer) or sensors are mounted, or the wall most free to expand. In embodiments with a large wall, the measurements of the phenomenon are made in many places and the thermal expansion is distributed differently depending on temperature changes along the large wall. In some such embodiments, the step of inserting a temperature sensor on the first wall is repeated along many locations on one or more walls. A thermocouple is a suitable temperature sensor for the hot temperatures in a gas turbine engine.

In some embodiments, the first wall is made up of two or more thermally conducting plates, such as metal or composite plates, separated by an insulating material, such as air. In some such embodiments, the temperature sensor is mounted in thermal contact with the inner plate closest to the heated fluid inside the chamber. In some embodiments, the temperature sensor is mounted in thermal contact with a different plate and calibration information is used to infer the temperature of the inner plate of the first wall based on the temperature measured at a different plate in the first wall. Thus, a first temperature sensor is configured to detect a temperature of the first wall.

In step 406 a "second" temperature sensor is mounted in thermal contact with an outer surface of the first wall to monitor ambient temperature away from the gas flow, for each chamber or space to be monitored. This step is done to take account of thermal gradients in the first wall that can affect transducers mounted away from the inner surface of the first wall. For example, in some embodiments, as described in more detail below with reference to FIG. 6B, the acoustic transducer is included in an acoustic waveguide, such as a horn, that is mounted to the first wall at both an inner plate and an outer plate of a first wall, with multiple plates separated by an thermal insulator. In such embodiments it is advantageous to know the difference in the thermal expansion between the inner surface and outer surface of the first wall. Both temperatures have an effect on the length of the acoustic path and potentially the angle of the acoustic waveguide horn if the two surfaces of the first wall expand differently. Even though the outer surface temperature may not be as important as the inner surface temperature, the outer surface temperature could still have an effect on the acoustic path that is advantageously compensated. Thus, in some embodiments, the system further comprises a second temperature sensor disposed in thermal contact with the outer plate.

In some embodiments, the first wall is a good thermal conductor, or the acoustic transducers are mounted to the inner surface or inner plate of the first wall, or otherwise the geometry of the acoustic transducers are affected only by thermal expansion of the inner surface of the first wall; and, in some such embodiments step 406 is omitted.

In step 407 one or more extra temperature sensors, called a "third" temperature sensor, is mounted in thermal contact with a sensor or waveguide. This step is done to take account of temperature sensitivity of the sensor or thermal expansion of a waveguide, or both. For example, in some embodiments, the acoustic transducer sensitivity depends on the temperature or must be cooled if the acoustic transducer becomes too hot. Thus, in some embodiments, the system further comprises an extra temperature sensor disposed in thermal contact with the acoustic transducer. In some of these embodiments the acoustic transducer is cooled if the extra temperature sensor records a temperature over a threshold at which cooling is desirable. In other embodiments, as described in more detail below with reference to FIG. 6B, the acoustic transducer is included in an acoustic waveguide, such as a horn. The acoustic waveguide is subject to thermal expansion itself, due to its own cooler temperature at a location removed from the hottest surfaces of the first wall of the chamber. Thus, in some embodiments, the system further comprises an extra temperature sensor disposed in thermal contact with the acoustic waveguide.

Recall that the data about the phenomenon collected from the sensor is called first data. In step 409, "second" data is collected from the one or more first temperature sensors, if present, in thermal contact with an inner surface of the first wall. The second data indicates temperature differences between the current temperature of the first wall and a nominal temperature at which the path lengths of various acoustic paths are known, e.g., from acoustic calibration at a known nominal temperature. It is often convenient for the nominal temperature to be an ambient temperature, such as room temperature (20 degrees Centigrade), when it is safe to enter the chamber to make measurements. Furthermore, in some embodiments, the calibration is done when the chamber is away from harsh environments, e.g., inside an air-conditioned facility, and all its metal parts are at the same ambient temperature not only because it is safe to probe the chamber, but also because the temperature distribution is known relatively accurately without tedious and costly 2D mapping with thermocouples or other devices.

In some embodiments, step 409 includes collecting "third" data from the one or more second temperature sensors, if present, in thermal contact with an outer surface of the first wall. In some embodiments, step 409 includes collecting "fourth" data from the one or more extra temperature sensors, if present, in thermal contact with the sensor or a waveguide in the first wall.

In step 411, the "first" data is collected at a processor, such as in control system 170, from the one or more sensors. For example, the first data indicates acoustic travel time between the actuator and sensor transducers on one or more paths through each space of one or more chambers. For example, a processor in electrical communication with the acoustic sensor is configured to receive from the acoustic sensor first data that indicates travel time along an acoustic path through the chamber between the first wall and a different wall of the chamber, such as an inner wall 229a or an opposite portion of the outer wall 229b.

In some embodiments an initial estimate of wall temperature is inferred from an acoustic travel time measurement, e.g., based on first arrival on an acoustic path along the first wall from two transducers on the first wall with a known nominal path length. Short path lengths are advantageous for this temperature determination because such paths are less affected by thermal expansion. In some such embodiments, steps 405, 406 and 407 are omitted. For example, in some such embodiments, the processor determines a first temperature of the first wall based on the first data and a nominal path length of one or more paths.

In step 413, for a current space through the chamber, a path length in the space is determined based on the nominal path length and thermal expansion due to the temperature difference. In various embodiments, the path length is known for a nominal temperature, such as ambient temperature before the fluid in the chamber is subjected to heating. The degree of thermal expansion from the nominal geometry is due to the temperature change from the nominal temperature when the geometry was calibrated. In various embodiments, a path length at a nominal temperature is known or calibrated with acoustic travel times at the known nominal temperature for which the sound speed can be derived.

In some embodiments, the thermal expansion is also dependent on the distance from the sensor to the one or more adjacent or nearest supports for the chamber that constrain expansion.

The path length is also affected by the angle of a waveguide, such as a horn, which is affected, in some embodiments, by the differential expansion of the inner and outer points where the waveguide is fixed to the first wall, such as at an inner plate and an outer plate of a first wall.

For example, for a circular wall, such as a radial plane slice of the outer wall 229b of the exhaust diffuser 229 of FIG. 2C, the circumference, c, of the wall is related to the radius, r, at the nominal temperature by equation 1.

$$c_0 = 2\pi r_0 \quad (1)$$

where $c_0$ is the circumference at a nominal initial temperature, e.g., when the geometry is calibrated and known, and $r_0$ is the radius at the nominal temperature. The change in circumference, dc, due to a temperature change, dt, can be expressed by Equation 2.

$$dc = 2\pi r_0 dt\alpha \quad (2)$$

where $\alpha$ is the linear thermal expansion coefficient and has units of millimeters (mm, 1 mm=$10^{-3}$ meters) of expansion per meter (m) of initial length (or in some embodiment fractional length change) per degree Celsius (° C.). For the stainless steel material making up the example exhaust diffuser, $\alpha = 19 \times 10^{-5}$ per ° C. The final circumference, $c_1$, and radius $r_1$ after changing temperature by dt are related to initial values by Equation 3a.

$$dc = c_1 - c_0 = 2\pi r_1 - 2\pi r_0 \quad (3a)$$

which, when combined with Equation 2, gives Equation 3b $$2\pi r_1 - 2\pi r_0 = 2\pi r_0 dt\alpha \quad (3b)$$

Which can be divided by $2\pi$ and rearranged to give the final radius using Equation 4.

$$r_1 = r_0 dt\alpha + r_0 = r_0(dt\alpha + 1) \quad (4).$$

In general, the distance D between two acoustic transducers on an unconstrained wall undergoing temperature change dt given by {Tnew−Told} is given by Equation 5.

$$Dnew = Dold(\{Tnew - Told\}\alpha + 1) \quad (5)$$

In some embodiments the nominal temperature, Told, is the ambient temperature when the distance between acoustic transducers was calibrated.

The thermal expansion compensated path length for the current space is then determined in step 413 based on the new positions of the acoustic transducers and the new radius of the reflecting wall on the opposite side of the space, both of which depend on the temperature difference {Tnew−Told}. Thus, the system includes a processor configured to determine a current path length of the path based at least in part on a nominal path length for a nominal temperature different from the first temperature and thermal expansion of the first wall due to the first temperature.

In some embodiments, the sensor is at a first distance from a nearest structural support for the chamber; and, determining the current path length includes determining the current path length of the acoustic path based at least in part on the first distance.

In some embodiments, the first wall includes an inner plate and an outer plate separated by a thermally insulating material and the sensor is mounted to both the inner plate and the outer plate. In some such embodiments; the system further includes a second temperature sensor. The first temperature sensor is disposed in thermal contact with the inner plate; and, the second temperature sensor is disposed in thermal contact with the outer plate. The first temperature is the temperature of the inner plate of the first wall. The processor is further configured for receiving from the second temperature sensor third data that indicates a second temperature of the outer plate of the first wall. In these embodiments; determining the current path length includes determining the current path length based on a difference between the thermal expansion of the inner plate of the first wall due to the first temperature and thermal expansion of the outer plate of the first wall due to the second temperature.

In some of these embodiments, the sensor is mounted in a waveguide in the first wall which opens into an inside of the chamber and for which the path through the chamber depends on temperature, e.g., by changing the angle of the waveguide relative to a wall of the chamber or changing the length of the waveguide, or some combination. In some of these embodiments, the system includes an extra temperature sensor disposed in thermal contact with the waveguide. The processor is further configured for receiving from the extra temperature sensor extra data that indicates a temperature of the waveguide. In some of these embodiments, determining the current path length includes determining the current path length based on the temperature of the waveguide.

In step 415, a property (such as either the temperature or the velocity, or both) of the gas flow is determined in the current space based on the first data (e.g., indicating the travel time) and on the thermal expansion compensated path length for the current space (called the current path length, for convenience) determined in step 413. In some of these embodiments, a sensitivity of the sensor depends on temperature and the system includes an extra temperature sensor disposed in thermal contact with the sensor. The processor is further configured for receiving from the extra temperature sensor fourth data that indicates a temperature of the sensor. In these embodiments, determining the property of the fluid flow in the chamber includes determining the property of the fluid flow in the chamber based on the temperature of the sensor. In some embodiments, a device, such as a coolant pump, is operated to cool the acoustic transducer in response to the temperature from the extra temperature sensor.

In some embodiments, in step 415, a spatial distribution of the fluid property within the current space is determined based on tomography (e.g., the inverse Radon transform, well known in the art) and multiple paths through the same space, e.g., for each of multiple different paths through the chamber. In some embodiments, there is an insufficient number of paths through each space; and, a spatial distribution is not determined in step 415.

Thus, the system includes a processor configured to determine a property of fluid flow in the chamber based on the first data and the current path length of the path.

In step 421, it is determined by module 180 whether there is another space to probe with different sensors. If so, control passes back to step 411. If not, then control passes to step 423. In some embodiments, step 423 is performed before step 421. In some embodiments, steps 413 and 415 are performed simultaneously by controller 170 for all paths or all spaces or some combination.

In step 423 a result is presented on a display device, or operation or design of the device including the chamber is modified, based on the fluid flow property in one or more spaces inside the chamber. Thus, the system includes a processor configured to operate a device (e.g., present a result on a computer display 714 or change operation of a boiler or gas turbine engine 100) based on the property (e.g., temperature or velocity) of fluid flow in the chamber.

In an example embodiment, temperature sensors are mounted on the inner and outer plates of an outer wall 229b of an exhaust diffuser in a gas turbine engine. FIG. 5 is a block diagram that illustrates an example exhaust diffuser 500 with multiple acoustic transducers 556 and at least one pair 590 of temperature sensors, according to an embodiment. This diffuser 500 is similar to the configuration shown in FIG. 2C, with no intervening shaft assembly. The outer plate 521a of the outer wall 520 of the exhaust diffuser 500 with circular cross section is shown in perspective view. An acoustic path between transducers 556a and 556b reflected off the opposite wall is affected by thermal expansion of outer wall 520 due to heat from the gas flow contained within. Data is collected from pair 590 of temperature sensors and acoustic transducer 556a over wired or wireless lines of electrical communication 572 by control system 570 with thermal compensation module 580, which are embodiments of control system 170 and thermal compensation module 189, respectively, described above with reference to FIG. 1A. These embodiments are specific for including compensation of thermal expansion of outer wall 520 of exhaust diffuser 500. A close-up view of acoustic transducer 556a and pair 590 of temperature sensors is shown in FIG. 6A.

Figure 6A:
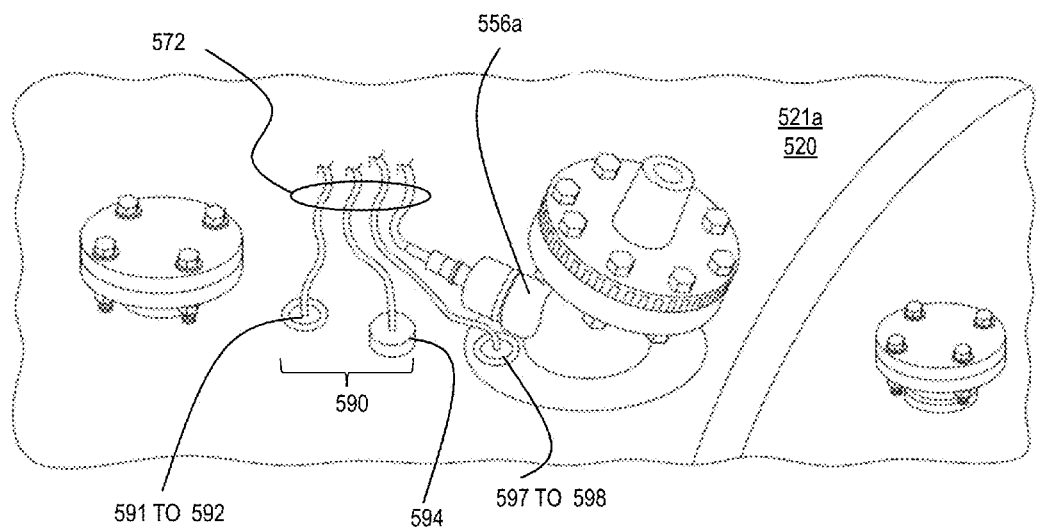
FIG. 6A and FIG. 6B are diagrams that illustrate two views of an example acoustic transducer and example temperature sensors relative to a space inside an exhaust diffuser, according to one embodiment.
Figure 6B:
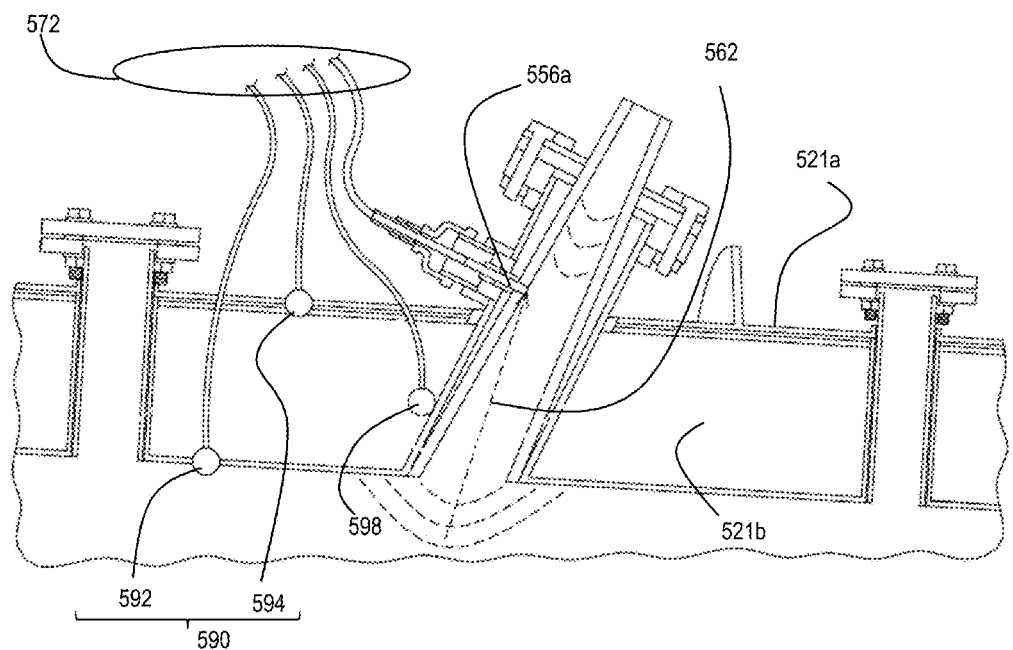

FIG. 6A and FIG. 6B are block diagrams that illustrate two views of an example acoustic transducer and temperature sensors relative to a space inside an exhaust diffuser, according to one embodiment. In this embodiment, outer wall 520 includes an inner plate 521b and an outer plate 521a separated by a thermal insulating material, e.g., air. FIG. 6A is a close up of a perspective view of an outer plate 521a of an outer wall 520 of the exhaust diffuser 500. Outer wall 520, outer plate 521a, acoustic transducer 556a, and lines of electrical communication 572 are as described above. The pair 590 of temperatures sensors is seen in this view to include a "second" temperature sensor 594 on the outer plate 521a and access port 591 to "first" temperature sensor 592 in thermal contact with a plate adjacent to the gas flow. Also shown is an access port 597 to an extra temperature sensor 598.

FIG. 6B is a block diagram that illustrates an example cross section through the outer wall 520. The outer plate 521a, acoustic transducer 556a, wired or wireless lines of electrical communication 572, and "second" temperature sensor 594 are as described above. The "first" temperatures sensor 592 is shown in thermal contact with an inner plate 521b of the outer wall 520. This measures the hottest surface of the outer wall 520 and its temperature reading is assumed to control the thermal expansion of the inner plate 521b.

The acoustic transducer 556a is in an acoustic waveguide horn. The acoustic waves, represented schematically by dotted wavefronts, are generated currently on the open end of the horn that shows an open hole in FIG. 6B. The acoustic waves are omnidirectional, fill the horn and are than nearly omnidirectional emitted into the space inside the diffuser 500. The so called acoustic beam 562 represents the single path from another source that arrives at the membrane of the microphone of the transducer 556a. Each path from different sources will arrive from a slightly different angle as all sources emit in all directions and based on the temperature, flow and position of the source vs receiver, the successful path that connects the source to the receiver is slightly different. The acoustic beam 562 used to probe the space of the gas flow is shown relative to the acoustic transducer 556a, and represents one acoustic path to one other acoustic transducer (or a reflected path back to transducer 556a).

Also shown is an extra temperature sensor 598 used in some embodiments for the determination the temperature of the waveguide, to allow the thermal expansion of the waveguide to be determined or to indicate whether the acoustic transducer may need cooling to stay within an operational temperature range, or both.

In some embodiments, both inner wall and outer wall movements of diffuser 500 are compensated for thermal expansion. Inner wall motion changes the hot gas volume and radial component of the path length whereas outer wall movement changes the distance between the acoustic transducer, and thus the axial component of the path length, in this embodiment. In some embodiments, a separate temperature sensor is used to determine the temperature of the inner wall (e.g., inner wall 229a) of an exhaust diffuser (e.g., diffuser 229).

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, which carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

Well-known structures and devices are shown in block diagram form in order to avoid unnecessarily obscuring the present invention. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The invention claimed is:

1. A system comprising:
   a chamber configured to surround a heated fluid;
   a sensor mounted in a first wall of the chamber to detect a phenomenon in the chamber;
   a device affected by a property of the heated fluid; and
   a processor in electrical communication with the sensor, the processor configured to perform at least the steps of:
      receiving from the sensor first data that indicates a value for the phenomenon along a path through the chamber between the first wall and a different wall of the chamber,
      determining a first temperature of the first wall;
      determining a current path length of the path based at least in part on a nominal path length for a nominal temperature different from the first temperature and thermal expansion of the first wall due to the first temperature;
      determining a property of fluid flow in the chamber based on the first data and the current path length of the path; and
      operating the device based on the property of fluid flow in the chamber.

2. A system as recited in claim 1, wherein:
   the chamber is at least one of a combustor in a gas turbine engine or an exhaust diffuser in a gas turbine engine;
   the sensor is an acoustic sensor;
   the phenomenon is acoustic travel time; and
   the property is temperature or velocity or both.

3. A system as recited in claim 1, wherein:
   the sensor is at a first distance from a nearest structural support for the chamber; and
   determining the current path length further comprises determining the current path length of the path based at least in part on the first distance.

4. A system as recited in claim 1 wherein determining the first temperature further comprises determining the first temperature based on the first data and the nominal path length.

5. A system as recited in claim 1 further comprising a first temperature sensor in thermal contact with the first wall, wherein:
   the processor is further configured for receiving from the first temperature sensor second data that indicates a temperature of the first wall; and
   determining the first temperature further comprises determining the first temperature equal to the temperature of the first wall based on the second data.

6. A system as recited in claim 5, wherein:
   the first wall comprises an inner plate and an outer plate separated by an thermally insulating material;
   the sensor is mounted to both the inner plate and the outer plate;
   the system further comprises a second temperature sensor;
   the first temperature sensor is disposed in thermal contact with the inner plate;
   the second temperature sensor is disposed in thermal contact with the outer plate;
   the first temperature is the temperature of the inner plate of the first wall;
   the processor is further configured for receiving from the second temperature sensor third data that indicates a second temperature of the outer plate of the first wall; and
   determining the current path length further comprises determining the current path length based on a difference between the thermal expansion of the inner plate of the first wall due to the first temperature and thermal expansion of the outer plate of the first wall due to the second temperature.

7. A system as recited in claim 5, wherein:
   a sensitivity of the sensor depends on temperature;
   the system further comprises a second temperature sensor disposed in thermal contact with the sensor;
   the processor is further configured for receiving from the second temperature sensor third data that indicates a second temperature of the sensor; and
   determining the property of the fluid flow in the chamber further comprises determining the property of the fluid flow in the chamber based on the second temperature of the sensor.

8. A system as recited in claim 5, wherein:
   the sensor is an acoustic transducer mounted in an acoustic waveguide in the first wall which opens into an inside of the chamber and for which the acoustic path depends on temperature;
   the system further comprises a second temperature sensor disposed in thermal contact with the acoustic waveguide;
   the processor is further configured for receiving from the second temperature sensor third data that indicates a second temperature of the acoustic waveguide; and
   determining the current path length further comprises determining the current path length based on the second temperature of the acoustic waveguide.

9. A method comprising:
   receiving on a processor, from a sensor mounted in a first wall of a chamber to detect a phenomenon in the chamber configured to surround a heated fluid, first data that indicates a value of the phenomenon along a path through the chamber between the first wall and a different wall of the chamber,
   determining on a processor a first temperature of the first wall;
   determining on a processor a current path length of the path based at least in part on a nominal path length for a nominal temperature different from the first temperature and thermal expansion of the first wall due to the first temperature;
   determining on a processor a property of fluid flow in the chamber based on the first data and the current path length of the path; and
   causing a device to be operated based on the property of fluid flow in the chamber.

10. A method as recited in claim 9, wherein:
    the chamber is at least one of a combustor in a gas turbine engine or an exhaust diffuser in a gas turbine engine;
    the sensor is an acoustic sensor;
    the phenomenon is acoustic travel time; and
    the property is temperature or velocity or both.

11. A method as recited in claim 9, wherein:
    the sensor is at a first distance from a nearest structural support for the chamber; and
    determining the current path length further comprises determining the current path length of the path based at least in part on the first distance.

12. A method as recited in claim 9 wherein determining the first temperature further comprises determining the first temperature based on the first data and the nominal path length.

13. A method as recited in claim 9, wherein:
the method further comprises receiving on a processor, from a first temperature sensor in thermal contact with the first wall, second data that indicates a temperature of the first wall; and
determining the first temperature further comprises determining the first temperature equal to the temperature of the first wall based on the second data.

14. A method as recited in claim 13, wherein:
the first wall comprises an inner plate and an outer plate separated by an thermally insulating material;
the sensor is mounted to both the inner plate and the outer plate;
the first temperature sensor is disposed in thermal contact with the inner plate;
the first temperature is the temperature of the inner plate of the first wall;
the method further comprises receiving from a second temperature sensor third data that indicates a second temperature of the outer plate of the first wall, wherein the second temperature sensor is disposed in thermal contact with the outer plate; and
determining the current path length further comprises determining the current path length based on a difference between the thermal expansion of the inner plate of the first wall due to the first temperature and thermal expansion of the outer plate of the first wall due to the second temperature.

15. A method as recited in claim 13, wherein:
a sensitivity of the sensor depends on temperature;
the method further comprises receiving on a processor, from a second temperature sensor disposed in thermal contact with the sensor, third data that indicates a second temperature of the sensor; and
determining the property of the fluid flow in the chamber further comprises determining the property of the fluid flow in the chamber based on the second temperature of the sensor.

16. A method as recited in claim 13, wherein:
the sensor is an acoustic transducer mounted in an acoustic waveguide in the first wall which opens into an inside of the chamber and for which the acoustic path depends on temperature;
the method further comprises receiving on a processor, from a second temperature sensor disposed in thermal contact with the acoustic waveguide, third data that indicates a second temperature of the acoustic waveguide; and
determining the current path length further comprises determining the current path length based on the second temperature of the acoustic waveguide.

17. A non-transitory computer readable medium carrying one or more sequences of instructions, wherein execution of the one or more sequences of instructions by one or more processors causes the one or more processors to perform the steps of:
receiving from a sensor mounted in a first wall of a chamber to detect phenomenon in the chamber configured to surround a heated fluid, first data that indicates a value of the phenomenon along a path through the chamber between the first wall and a different wall of the chamber,
determining a first temperature of the first wall;
determining a current path length of the path based at least in part on a nominal path length for a nominal temperature different from the first temperature and thermal expansion of the first wall due to the first temperature;
determining a property of fluid flow in the chamber based on the first data and the current path length of the path; and
causing a device to be operated based on the property of fluid flow in the chamber.

18. A non-transitory computer readable medium as recited in claim 17, wherein:
execution of the one or more sequences of instructions further causes the one or more processors to perform the step of receiving, from a first temperature sensor in thermal contact with the first wall, second data that indicates a temperature of the first wall; and
determining the first temperature further comprises determining the first temperature equal to the temperature of the first wall based on the second data.

19. A non-transitory computer readable medium as recited in claim 18, wherein:
the first wall comprises an inner plate and an outer plate separated by an thermally insulating material;
the sensor is mounted to both the inner plate and the outer plate;
the first temperature sensor is disposed in thermal contact with the inner plate;
the first temperature is the temperature of the inner plate of the first wall;
execution of the one or more sequences of instructions further causes the one or more processors to perform the step of receiving from a second temperature sensor third data that indicates a second temperature of the outer plate of the first wall, wherein the second temperature sensor is disposed in thermal contact with the outer plate; and
determining the current path length further comprises determining the current path length based on a difference between the thermal expansion of the inner plate of the first wall due to the first temperature and thermal expansion of the outer plate of the first wall due to the second temperature.

20. A non-transitory computer readable medium as recited in claim 18, wherein:
the sensor is an acoustic transducer mounted in an acoustic waveguide in the first wall which opens into an inside of the chamber and for which the path is an acoustic path that depends on temperature;
execution of the one or more sequences of instructions further causes the one or more processors to perform the step of receiving, from a second temperature sensor disposed in thermal contact with the acoustic waveguide, third data that indicates a second temperature of the acoustic waveguide; and
determining the current path length further comprises determining the current path length based on the second temperature of the acoustic waveguide.

* * * * *